(12) United States Patent
Shinaut et al.

(10) Patent No.: US 7,744,336 B2
(45) Date of Patent: Jun. 29, 2010

(54) REBAR SEPARATOR WITH INFLATABLE VIBRATIONAL CUSHIONS AND TORSION BAR VIBRATION TRANSFERRAL

(76) Inventors: Ken Shinaut, 335 E. 3575 North, North Ogden, UT (US) 84414; Steven S. Anglesey, 1691 N. 250 West, Layton, UT (US) 84041

( * ) Notice: Subject to any disclaimer, the term of this patent is extended or adjusted under 35 U.S.C. 154(b) by 581 days.

(21) Appl. No.: 10/459,938

(22) Filed: Jun. 11, 2003

(65) Prior Publication Data
US 2004/0253090 A1 Dec. 16, 2004

(51) Int. Cl.
*B66F 11/00* (2006.01)
*B65G 25/00* (2006.01)
*B65G 27/00* (2006.01)

(52) U.S. Cl. .......... 414/746.1; 414/746.6; 198/443; 198/774.4; 198/752.1

(58) Field of Classification Search .......... 198/529, 198/633, 463.5, 459.4, 339.1; 414/745.7, 414/745.8, 745.9, 746.1, 746.2, 746.4, 746.6
See application file for complete search history.

(56) References Cited

U.S. PATENT DOCUMENTS

| | | | |
|---|---|---|---|
| 2,821,292 A * | 1/1958 | Spurlin | 198/763 |
| 3,086,637 A * | 4/1963 | Graef | 198/633 |
| 3,112,823 A * | 12/1963 | Musschoot | 198/751 |
| 3,144,139 A * | 8/1964 | Chapellier | 414/745.9 |
| 3,236,381 A * | 2/1966 | Poynter | 209/325 |
| 3,253,721 A * | 5/1966 | Lakins | 414/746.4 |
| 3,322,259 A * | 5/1967 | Milazzo | 198/460.1 |
| 3,587,822 A * | 6/1971 | White | 198/463.5 |
| 3,917,078 A * | 11/1975 | Schmidt | 414/745.7 |
| 4,002,248 A * | 1/1977 | Moller | 414/745.7 |
| 4,024,946 A * | 5/1977 | Muller et al. | 198/570 |
| 4,173,277 A * | 11/1979 | Zimmerman | 198/443 |
| 4,353,457 A * | 10/1982 | Haley | 198/774.2 |
| 4,804,077 A * | 2/1989 | John, Jr. | 198/339.1 |

* cited by examiner

*Primary Examiner*—Gregory W Adams
(74) *Attorney, Agent, or Firm*—Fehr Law Firm; Thompson E. Fehr

(57) ABSTRACT

A rebar separator having a crossbar situated atop one or, preferably, two vibrational insulators which are preferably inflatable cushions. Preferably, there are two or more such crossbars on one or two inflatable cushions. At least one vibrational motor is in contact with at least one crossbar. And preferably each crossbar slopes from a first end to a second end. A source of fluid is in communication with each inflatable cushion. Preferably, the vibrational insulators are placed on top of first and second longitudinal channels of a horizontal rack.

1 Claim, 7 Drawing Sheets

REBAR SEPARATOR WITH INFLATABLE VIBRATIONAL CUSHIONS AND TORSION BAR VIBRATION TRANSFERRAL

BACKGROUND OF THE INVENTION

1. Field of the Invention

This invention relates to a device for separating rebar from tangled bundles of rebar.

2. Description of the Related Art

Rebar comprises the elongated cylindrical steel rods which are placed within concrete to reinforce such concrete.

The rods of rebar come in bundles and often become entangled with one another.

At a facility which cuts and, on occasion, bends the rebar to make it suitable for particular purposes, a bundle of rebar is placed upon a horizontal rack. Then, after removing the straps which hold the bundle together, an individual manually grasps and shakes one rod at a time until it is loosened from the other rods. Such rod is then moved to a portion of the horizontal rack which can have one edge lowered to dump the separated rod onto rollers to be transported for measuring and cutting.

The only prior non-manual separator for rebar of which the present inventor is aware is that described in U.S. Pat. No. 6,357,995. That separator utilizes a "blade-like member 55" that is moved longitudinally with respect to the rebar. Apparently, it is inserted between two intertwined pieces of rebar and then moved longitudinally.

BRIEF SUMMARY OF THE INVENTION

The Rebar Separator of the present invention isolates one or more crossbars from a rack used to hold rebar and utilizes a motor to vibrate such crossbars. Such vibration tends to separate rods of rebar that are tangled with one another when initially placed upon the crossbars.

The crossbars are placed atop horizontal racks that are traditionally used to hold rebar and are isolated from such racks by cushions which can be filled with fluid, preferably, air.

DETAILED DESCRIPTION OF THE INVENTION

Figure 1:
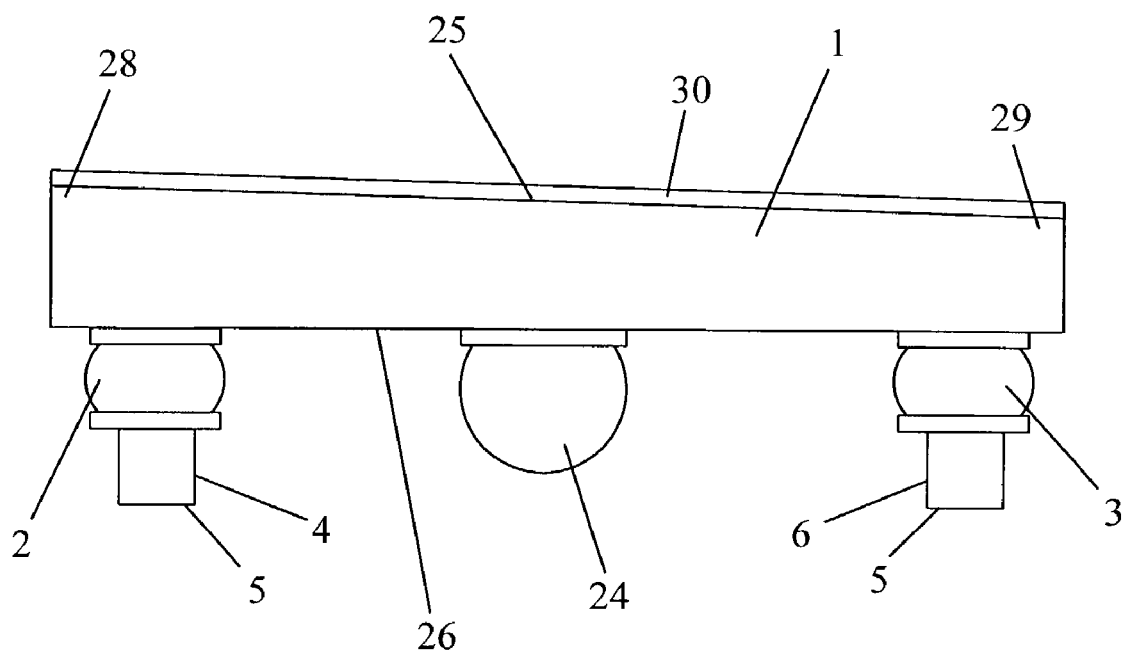
FIG. 1 illustrates a crossbar placed atop two cushions resting on two inflatable cushions atop longitudinal channels of a horizontal rack.

As illustrated in FIG. 1, the Rebar Separator has a crossbar 1 that is placed atop a first vibrational insulator, preferably an inflatable cushion, 2 and, preferably, also atop a second vibrational insulator, preferably an inflatable cushion, 3. The first cushion 2 is preferably located on top of a first longitudinal channel 4 of a horizontal rack 5; the second cushion 3 is preferably located on top of a second longitudinal channel 6 of the horizontal rack 5.

Figure 2:
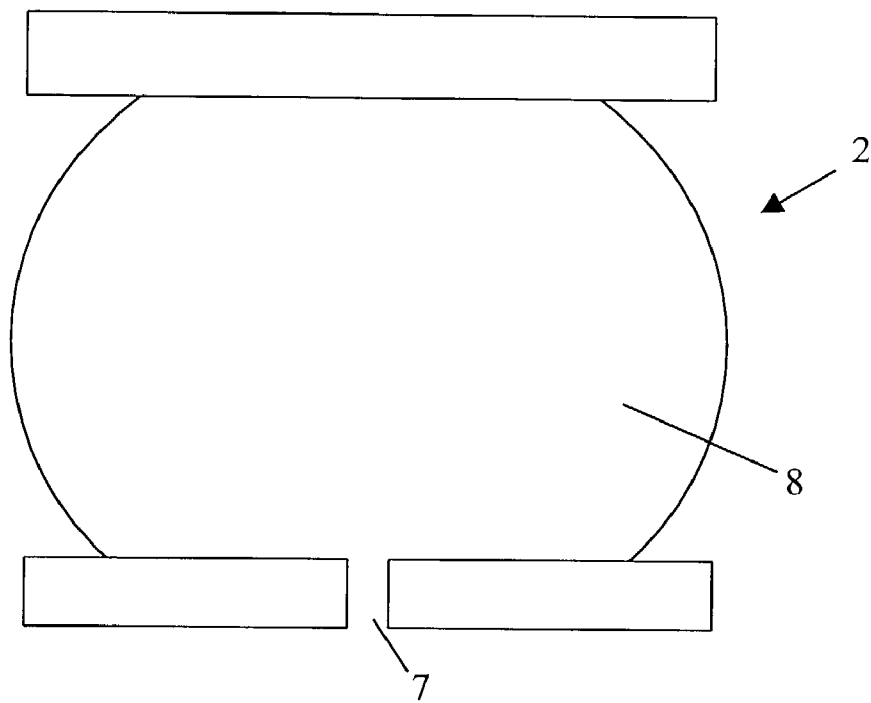
FIG. 2 is a cross-sectional view of a first inflatable cushion.
Figure 3:
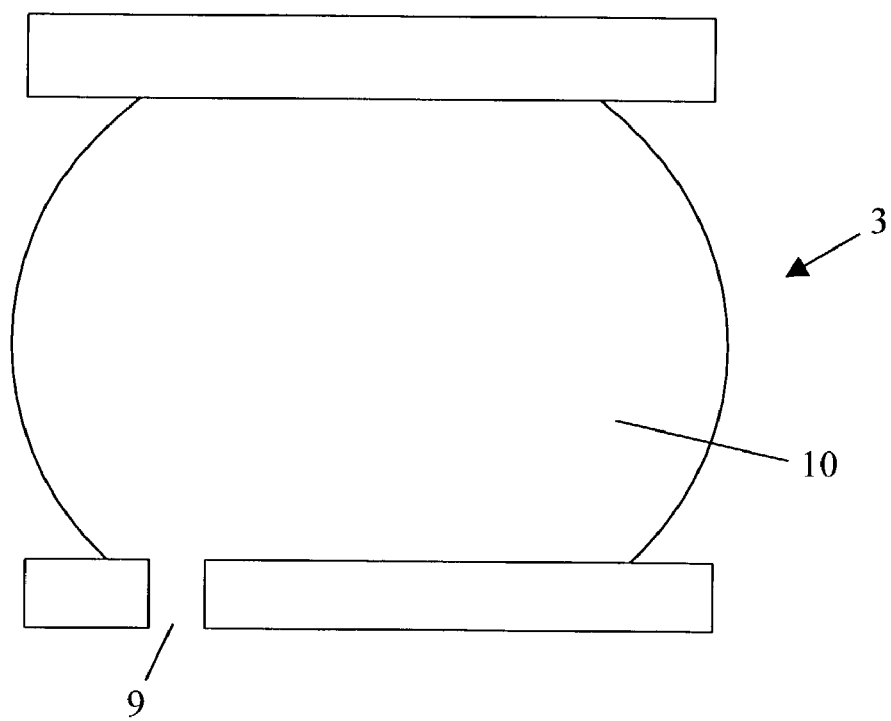
FIG. 3 provides a cross-sectional view of a second inflatable cushion, with the aperture in an alternate location from that in the embodiment of FIG. 2.

The first cushion 2 contains an aperture 7, depicted in FIG. 2, which aperture 7 communicates with the interior 8 of the first inflatable cushion 2. Similarly, the second cushion 3 contains an aperture 9, depicted in FIG. 3, which aperture 9 communicates with the interior 10 of the second inflatable cushion 3.

A fluid, preferably air, is provided to, and withdrawn from, the first inflatable cushion 2 through aperture 7. Similarly, a fluid, preferably air, is provided to, and withdrawn from, the second inflatable cushion 3 through aperture 9.

Figure 4:
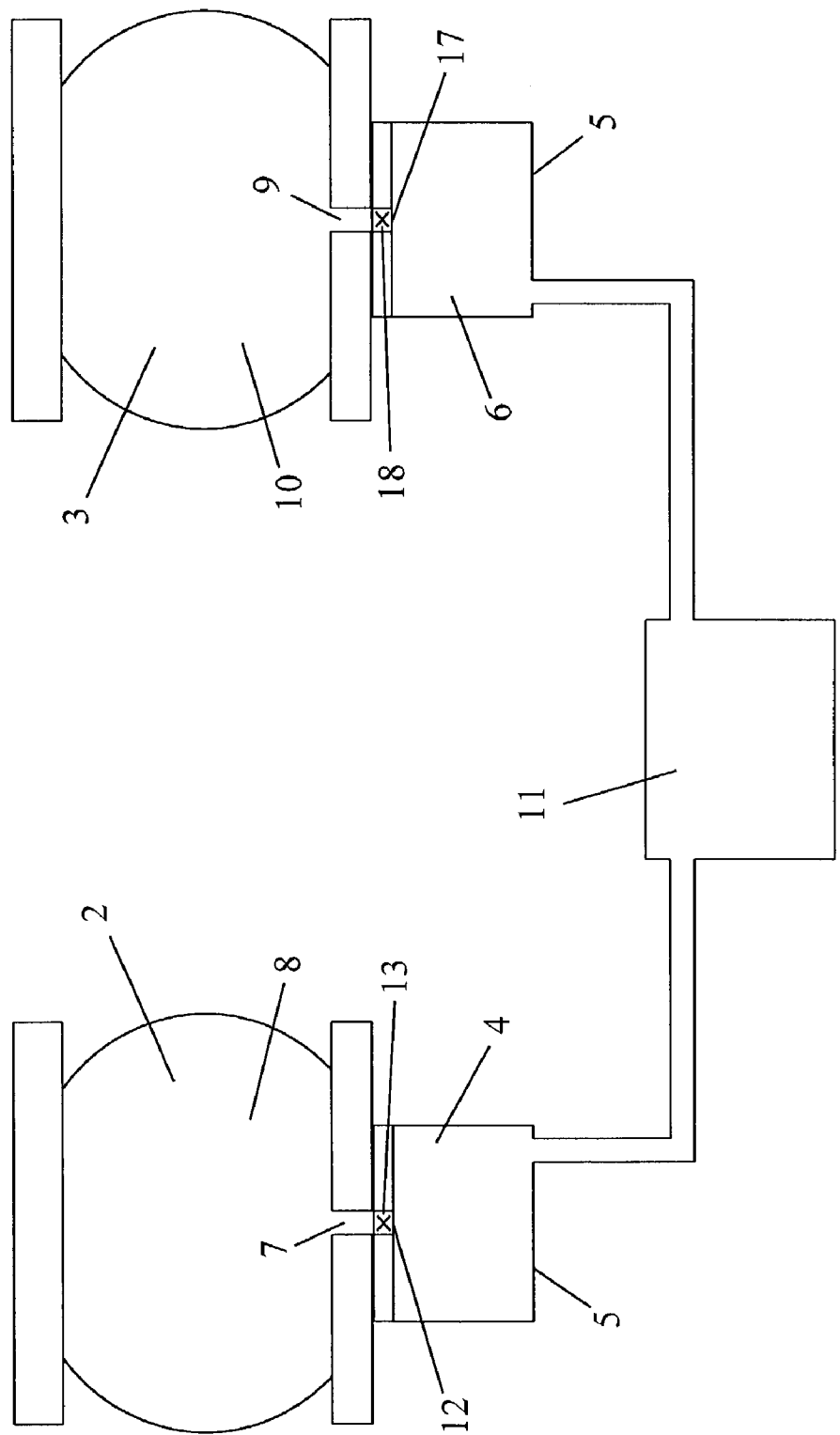
FIG. 4 portrays, in cross-sectional view, a first longitudinal channel in fluid communication both with a first inflatable cushion and a source of fluid and a second longitudinal channel in fluid communication both with a first inflatable cushion and a source of fluid.
Figure 5:
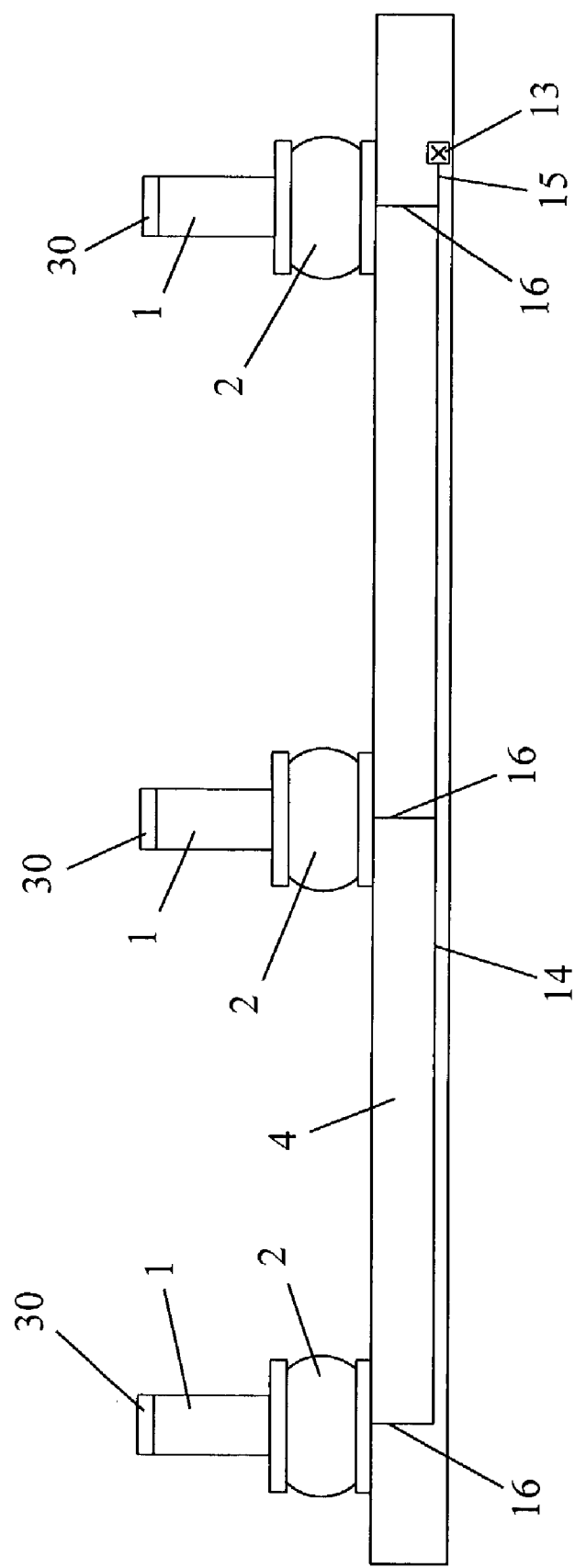
FIG. 5 shows a first branched, hollow line inserted, with fluid communication, between a first longitudinal channel and several first inflatable cushions.

If the first longitudinal channel 4 is hollow, such first longitudinal channel 4 is, as shown in FIG. 4, in fluid communication with a source 11 of fluid and contains an aperture 12 in fluid communication with the aperture 7 of the first inflatable cushion 2 of associated with each given crossbar 1 (since it is preferable to employ two or more crossbars 1 on each horizontal rack 5). A valve 13 is preferably inserted between the aperture 12 and the corresponding aperture 7 to control the flow of fluid into or from the first inflatable cushion 2. And, even more preferably, as illustrated in FIG. 5, a first hollow tube 14 has a first end 15 attached to, and in fluid communication with, the valve 13, which, in such option, is fluidically, but not necessarily physically, between the aperture 12 and the apertures 7. (Also, in such option, the location of the aperture 12 is not necessarily the same as when the valve 13 is physically between aperture 12 and aperture 7.) The first hollow tube 14 branches in order to have two or more, preferably three, second ends 16 with each of the second ends 16 connected to, and in fluid communication with, an aperture 7 of a first inflatable cushion 2.

Figure 6:
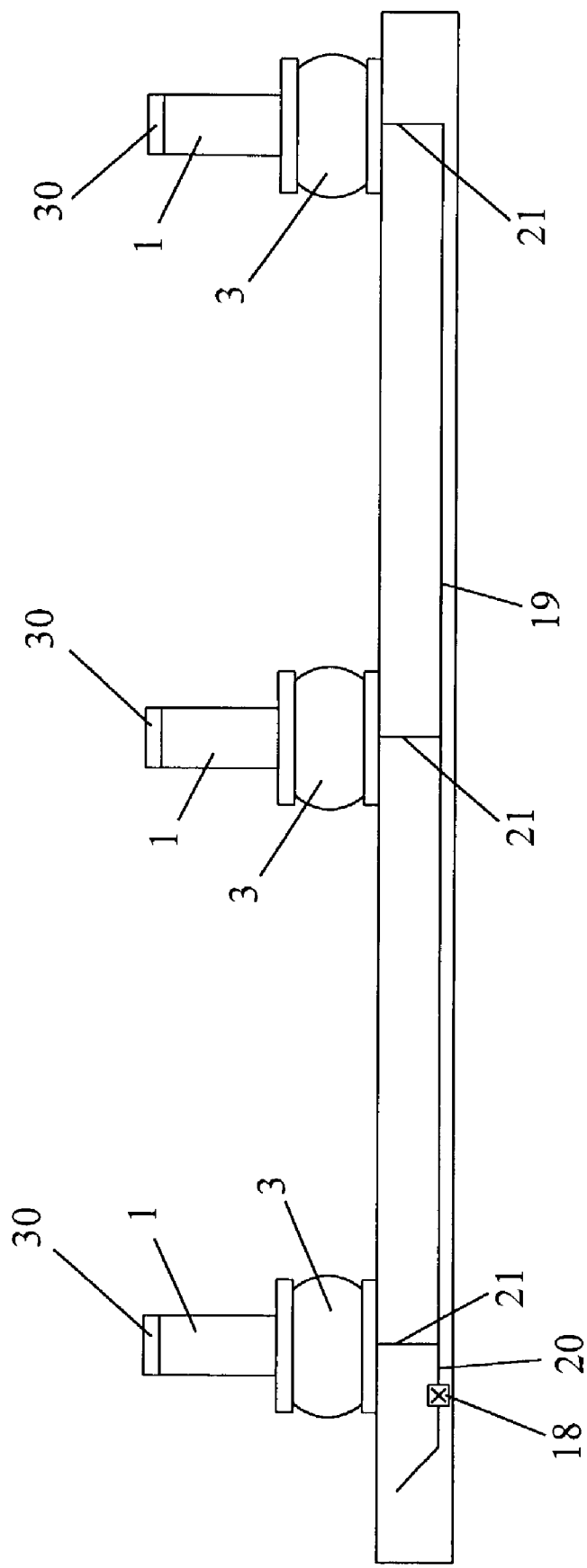
FIG. 6 illustrates a second branched, hollow line inserted, with fluid communication, between a second longitudinal channel and several second inflatable cushions.

Similarly, if the second longitudinal channel 6 is hollow, such second longitudinal channel 6 is, as shown in FIG. 4, in fluid communication with a source 11 of fluid and contains an aperture 17 in fluid communication with the aperture 9 of the second inflatable cushion 3 associated with each given crossbar 1 (since it is preferable to employ two or more crossbars 1 on each horizontal rack 5). A valve 18 is preferably inserted between an aperture 17 and the corresponding aperture 9 to control the flow of fluid into or from the second inflatable cushion 3. And, even more preferably, as shown in FIG. 6, a second hollow tube 19 has a first end 20 attached to, and in fluid communication with, the valve 18, which, in such option, is fluidically, but not necessarily, physically between the aperture 17 and the apertures 9. (Also, in such option, the location of the aperture 17 is not necessarily the same as when the valve 18 is physically between aperture 17 and an aperture 9). The second hollow tube 19 branches in order to have two or more, preferably three, second ends 21 with each of the second ends 21 connected to, and in fluid communication with, an aperture 9 of a second inflatable cushion 3.

Figure 7:
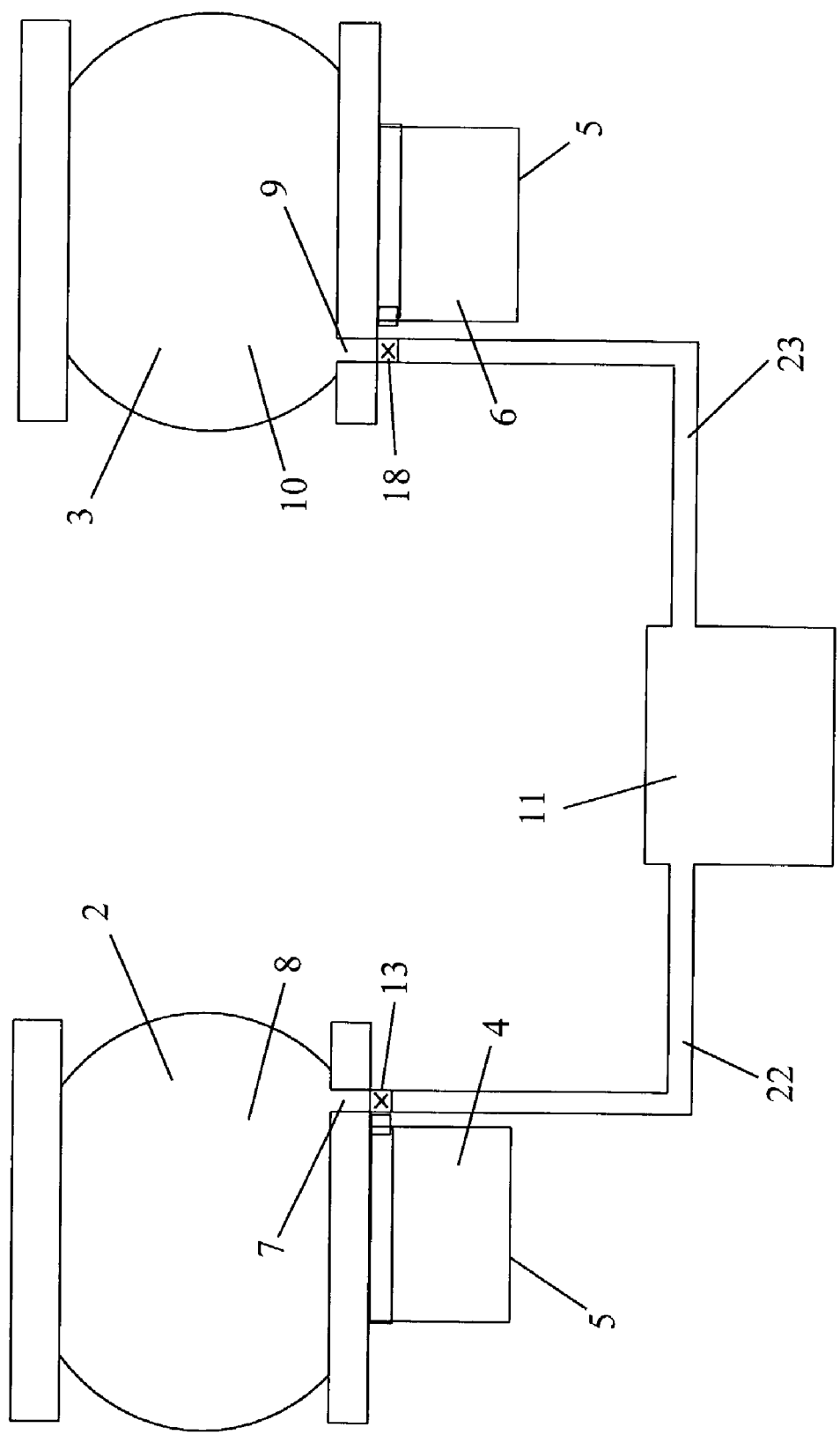
FIG. 7 shows hollow lines replacing the first and second longitudinal channels in the embodiment of FIG. 4, for the purpose of supplying fluid.

Optionally, as portrayed in FIG. 7, the first longitudinal channel 4 can, for the purpose of supplying fluid, be replaced by a first hollow tube 22; and the second longitudinal channel 6 can, for the purpose of supplying fluid, be replaced by a second hollow tube 23.

Also in contact with, and preferably attached to, the crossbar 1 is a vibrational motor 24. The vibrational motor can be located anywhere on the crossbar 1 that will not impede the movements of rods of rebar, which are to be placed on the top 25 of the crossbar 1, making the bottom 26 of the crossbar between the first inflatable cushion 2 and the second inflatable cushion 3 the preferred location for the vibrational motor 24, as seen in FIG. 1. When several crossbars 1 are employed on a given horizontal rack 5, it is, however, not necessary to have a vibrational motor attached to each crossbar 1.

Figure 8:
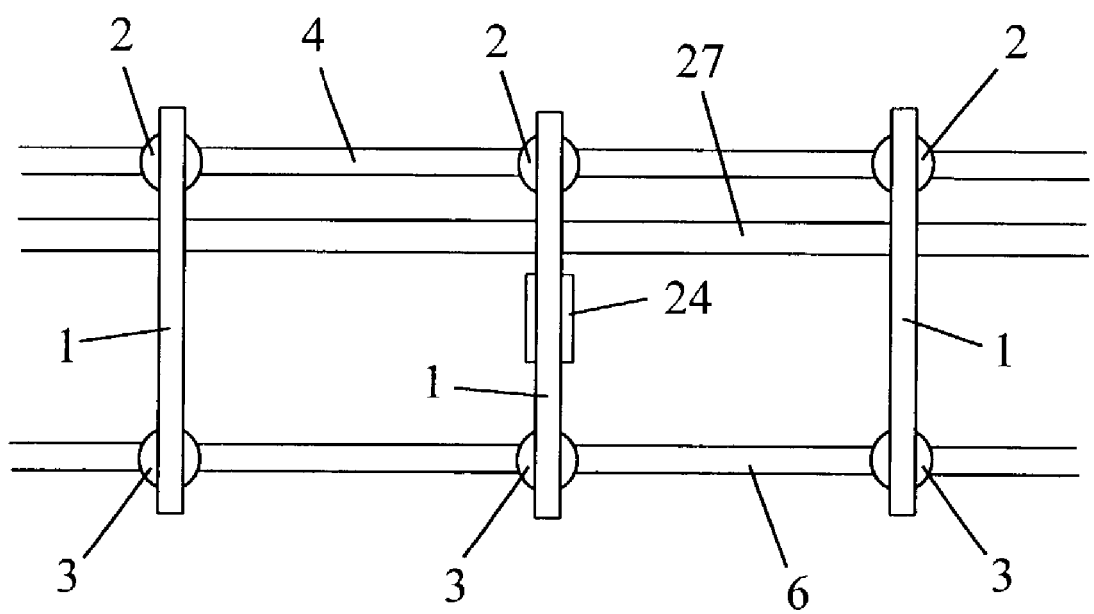
FIG. 8 depicts a substantially rigid torsion bar attached to several crossbars.

Optionally, a substantially rigid torsion bar 27 is, as depicted in FIG. 8, attached to one or more, and preferably each, crossbar 1, in order to increase the uniformity of vibration of the crossbars 1. Substantially, in this context, means that the amount the rigid torsion bar 27 moves under force is only such that one of ordinary skill in the field would consider the torsion bar 27 to be rigid.

Preferably, the top 25 of the crossbar 1 slants downward from a first end 28 of the crossbar 1 to a second end 29 of the crossbar 1 in order to encourage the rods of rebar to move toward the second end 29 of the crossbar 1 when the vibrational motor 24 is activated, although the direction of movement of such rods tends to reverse when the vibrational motor 24 is operated in a reverse direction.

Also, the second inflatable cushion 3 can be inflated less that the first inflatable cushion 2 in order to increase the tendency of the rods of rebar to move toward the second end 29 of the crossbar 1.

Preferably, the crossbar 1 is made of metal; and, optionally, a layer 30 that is softer than metal can be placed on the top 25 of the crossbar 1 in order to protect the rods of rebar. A preferred material from which the layer 30 is made is ultra-high-weight molecular plastic (UHWM).

As used herein the term "preferable" or "preferably" means that a specified element or technique is more acceptable than another but not that such specified element or technique is a necessity.

We claim:

1. A rebar separator, which comprises:
   two or more crossbars, each of said crossbars having a top, a first end, and a second end and each of said crossbars slanting downward from its first end to its second end;
   for each of said crossbars, a first inflatable cushion under said crossbar;
   for each of said crossbars, a second inflatable cushion under said crossbar;
   a source of fluid in fluid communication with each of said first inflatable cushions and with each of said second inflatable cushions;
   a vibrational motor in contact with one of said crossbars; and
   a substantially rigid torsion bar attached to said crossbars.

* * * * *